United States Patent [19]

McDaniels, Jr.

[11] Patent Number: 5,274,682
[45] Date of Patent: Dec. 28, 1993

[54] METHOD AND APPARATUS FOR STORING NUCLEAR FUEL RODS

[75] Inventor: John D. McDaniels, Jr., Solana Beach, Calif.

[73] Assignee: Nuclear Assurance Corporation, Inc., Norcross, Ga.

[21] Appl. No.: 6,034

[22] Filed: Jan. 19, 1993

Related U.S. Application Data

[63] Continuation-in-part of Ser. No. 831,404, Feb. 5, 1992, Pat. No. 5,194,216, which is a continuation-in-part of Ser. No. 570,812, Aug. 22, 1990, Pat. No. 5,098,644.

[51] Int. Cl.⁵ .......................................... G21C 19/32
[52] U.S. Cl. .................................... 376/261; 376/272; 376/313
[58] Field of Search ........................ 376/261, 272, 313

[56] References Cited

U.S. PATENT DOCUMENTS

| | | | |
|---|---|---|---|
| 4,457,888 | 7/1984 | Vickrey, Jr. | 376/272 |
| 4,474,727 | 10/1984 | Kmonk et al. | 376/272 |
| 4,619,808 | 10/1986 | Formanek | 376/272 |
| 4,659,536 | 4/1987 | Baudro | 376/261 |
| 4,731,219 | 3/1988 | Beneck et al. | 376/261 |
| 5,000,906 | 3/1991 | Ellingson et al. | 376/261 |
| 5,016,776 | 5/1991 | Falzarano et al. | 376/272 |
| 5,098,644 | 3/1992 | McDaniels | 376/261 |
| 5,194,216 | 3/1993 | McDaniels, Jr. | 376/261 |

Primary Examiner—Daniel D. Wasil
Attorney, Agent, or Firm—Hopkins & Thomas

[57] ABSTRACT

A storage canister for spent nuclear fuel rods, having loading and storage configurations, has an open end and an apertured end wall, and means therein defining a plurality of rod locations. The canister also has movable means therein for vertically offsetting adjacent rods within the canister so that any pair of adjacent rods are vertically offset from each other. The movable means is positioned during loading to permit fluid flow into and out of the canister through the apertured end wall and in the storage configuration blocks at least one of the apertures in the end wall. The movable means may also be used to lift the fuel rods such that their tops extend above the canister body to permit removal of one or more rods. A closure member for the open end has a locking mechanism for locking it to the canister and a tamper indicating mechanism.

34 Claims, 7 Drawing Sheets

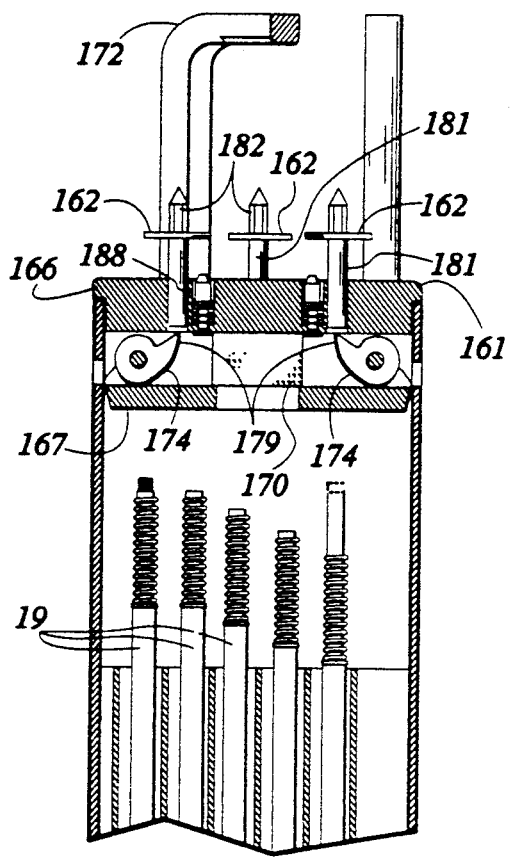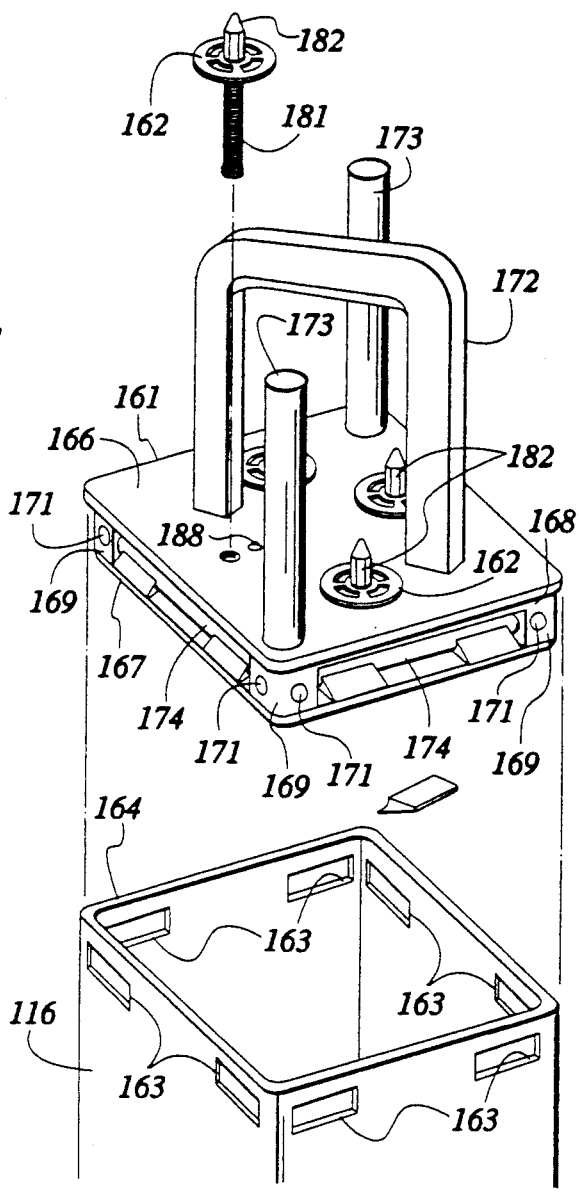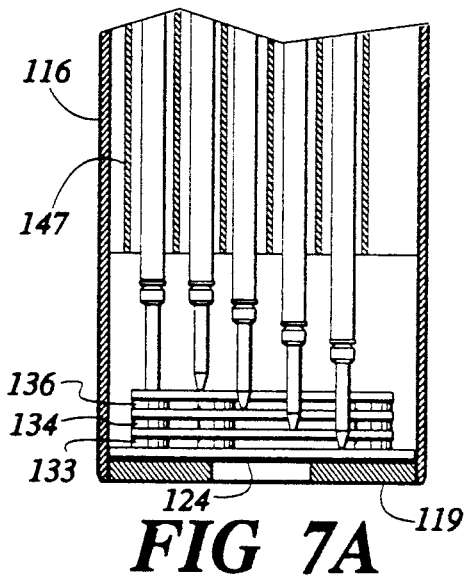
FIG 7A
FIG 8
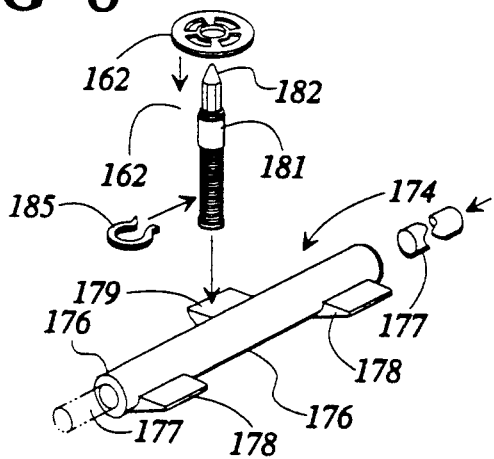
FIG 7B

METHOD AND APPARATUS FOR STORING NUCLEAR FUEL RODS

This application is a continuation-in-part of U.S. patent application Ser. No. 07/831,404, entitled "Guide Plates For Locating Rods In An Array", filed Feb. 5, 1992, now U.S. Pat. No. 5,194,216, which is a continuation-in-part of U.S. patent application Ser. No. 07/570,812, entitled "Apparatus for Consolidation of Spent Nuclear Fuel Rods", filed Aug. 22, 1990, now U.S. Pat. No. 5,098,644. The disclosures of both patent application Ser. Nos. 07/570,812 and 07/831,404 are incorporated herein by reference as if set forth in full hereinafter.

FIELD OF THE INVENTION

The present invention relates to the consolidation of spent nuclear fuel rods, and, more particularly, to a storage canister for spent rods and the method of loading and sealing it.

BACKGROUND OF THE INVENTION

Nuclear fuel assemblies for powering nuclear reactors generally consist of large numbers of fuel rods contained in discrete fuel rod assemblies. These assemblies or cells generally consist of a bottom end fitting or nozzle, a plurality of fuel rods extending upwardly therefrom and spaced from each other in a square or triangular pitch configuration, spacer grids situated periodically along the length of the assembly for support and orientation of the fuel rods, a plurality of control guide tubes interspersed throughout the rod assembly, and a top end fitting or cap. Moreover, the assembly is installed and removed from the reactor as a unit.

When the nuclear fuel rods have expended a large amount of their available energy, the fuel rods are considered to be "spent," and the fuel rod assembly is pulled from the reactor and temporarily stored in an adjacent pool until the assemblies are transported to a reprocessing center or to permanent or temporary storage. Even though the rods are considered "spent," they are still highly radioactive and constitute a very real hazard both to personnel and to property.

In general, there are a number of alternatives available for disposition of the radioactive spent fuel rods, none of which is totally satisfactory. The fuel rod assemblies can be enclosed in a suitable basket and cask arrangement and transported to a storage facility, or possibly, to a reprocessing plant. A second alternative is to store the spent fuel in a dry storage system. Dry storage entails either the use of a large number of metal casks or the building of massive concrete containers either above or below ground, which is a very expensive process, and, where the storage system is above ground, it is often not acceptable to people living or working in its vicinity. A third alternative is the storage of the fuel units in the existing water pool originally designed for temporary storage. This type of storage is the simplest and cheapest, since the fuel rod assemblies can remain in the pool and be left there until the appropriate governmental agency or other agency collects them, often at the end of the life of the nuclear plant. However, such storage pools have a limited capacity, and, where they are adjacent to the nuclear reactor, when one becomes full the construction of a new pool is necessary.

Numerous attempts have been made to increase the capacity of a pool through a process known as fuel rod compaction or consolidation. This process, in brief, comprises removing the fuel rods from each fuel rod assembly and placing them in a storage canister where they are placed in rows with minimal spacing, most often in a square or triangular array. It is possible, with this process, to place the fuel rods from two or more fuel assemblies into a single storage canister, thereby achieving approximately a 1:2 reduction in required pool volume, or, conversely, a 2:1 increase in pool storage capacity. Examples of such rod consolidation systems are shown in U.S. Pat. No. 4,659,536 of Baudro; U.S. Pat. No. 4,731,219 of Beneck, et al.; and U.S. Pat. No. 5,000,906 of Ellingson, et al. However, successful consolidation has been an elusive goal for a number of reasons. Inasmuch as the pools are approximately forty feet deep, and inasmuch as the rods must remain immersed in the water at all times, all of the consolidation operations must be performed under the shielding and cooling water. In addition, even though the rods are kept under water, the process could be quite hazardous to personnel performing the operation. The rods themselves, because of their dimensions, for example, one-half inch in diameter and eighteen feet long, are subject to flexing and bending. As a consequence, placing the rods in a desired location can be quite difficult.

Prior art arrangements, such as the Beneck et al. system, for achieving rod consolidation have included a system whereby the rods are pulled out row-by-row, as in, for example, a 14×14 matrix of rods, lifted and deposited in a tapered interim storage container, which tapers from a large area top opening to a bottom that has the area of a storage canister. After the intermediate container has the rods from approximately two fuel assemblies deposited therein, the intermediate container is placed over a storage canister, and the bottom plate of the tapered container is lowered or removed to cause the rods to slide into the storage canister. If the rods jam or stick, as they often do, they must be pushed from above the pool by operators using long rods. This last operation is made more difficult in that the rods develop on their outside surfaces what is referred to in the trade as "crud". When the fuel rods are pulled, this radioactive crud is scraped off and clouds the water making it difficult for the operators to see what they are doing and contaminating the pool. The method just described has proven to be quite slow and complicated, and can be hazardous to personnel.

After a storage canister has been filled, it is generally capped by a lid member. In accordance with U.S. government requirements for storing spent nuclear fuel rods, the lid must be lockable or self-locking with tamper proof, or tamper indicating mechanisms. Meticulous records must be kept by the operator as to just what has been put in the canister and when, and the lock and tamper indicator is intended to insure that what has been put in the canister remains there, undisturbed. An example of a storage canister and a lid locking mechanism is disclosed in U.S. Pat. No. 4,474,727 of Kmonk, et al.

SUMMARY OF INVENTION

The present invention is a storage canister for spent nuclear fuel rods and the method of loading and locking the canister with a tamper indicating mechanism.

The apparatus and methodology of the present invention may, for example, be primarily used in an automated nuclear fuel rod consolidation system which comprises a commercially available five or six axes robot mounted on the operations floor along the side of the storage pool. Directly below the robot within the pool, at a depth of, for example, twenty-five feet, is an apertured work table, and resting on the floor of the pool directly below the work table is a header and support base, which includes a manifold for a pair of vacuum filter assemblies which are mounted to, and extend upwardly from, the support base. Extending vertically from the support base and into openings in the work table are a plurality of holders configured to support fuel assemblies or fuel rod canisters, which are accessible from above the work table.

A plurality of individual or multiple purpose long reach tools are mounted on racks above and to either side of the work table. Each of the tools has a quick change coupling mounted to its upper end which matches and is adapted to couple with a corresponding quick change coupling on the end of the robot arm.

Locating pins are mounted on the top surface of the work table, and a position sensor carried by one of the long reach tools sends signals to the computer to give precise locations on the work table, thereby enabling the computer to determine the exact location of all components in the system.

In operation, three or four spent fuel rod assemblies are transferred, under water, to the fuel rod assembly holders as dictated by the number of cells provided in the work table for fuel rod assemblies. Empty canisters are transferred to canister holders and their lids are placed in a well located in the work table. The upper end fittings of the fuel rod assemblies are then cut away by a long reach tool having a cutter on its lower end and placed in a scrap canister. Alternatively, the upper end fittings can be unbolted on those fuel assembly types which permit this type of removal.

The computer next directs the robot to couple with a fuel rod transfer tool having a collet for grasping a fuel rod and pulling it out of the rod assembly up into the tool. When this occurs, crud is scraped off of the rod, but, because of the downward water current created by the filter units with their associated pumps, the crud passed down the holder into the manifold and up through the filter, thereby preventing clouding of the water and contamination of the pool.

To ensure that the rod transfer tool centers exactly over a rod to be pulled, an apertured funnel guide plate is placed over the fuel rod assembly, which precisely locates every fourth rod in the assembly, for example. The funnel guide plate is indexed by means of locating pins that fit into holes in the work table or by slots or channels on the underside of the plate that engages the top edges of the canister so that ultimately all of the rods are pulled. The funnel guide plate is the subject of U.S. patent application Ser. No. 07/831,404, filed Feb. 5, 1992, of which this application is a continuation-in-part.

After the canister is completely filled, the skeleton of the fuel rod assembly, comprising guide tubes and spacer grids, is subjected to compaction. The guide tubes are cut above and below the grids, and each tube section is fed into the tube compactor where it is repeatedly cut and flattened into small pieces and then dropped into the scrap canister. Finally, the spacer grids are introduced into a grid crushing apparatus, where the spacer grids are crushed in accordance with a novel methodology which forms the basis of U.S. patent application Ser. No. 07/570,812, filed Aug. 22, 1990, also a continuation in part of U.S. patent application Ser. No. 07/831,404 filed Feb. 5, 1992.

In accordance with the present invention, in a preferred embodiment thereof, the storage canister has a loading configuration and a storage configuration and comprises an elongated hollow tubular member, rectangular or square shaped in cross-section, having a plurality of spacers or dividers therein and affixed thereto, defining an array of rod locations within the canister. The bottom wall of the canister has an opening therein for permitting passage of water therethrough, and an apertured base plate, axially slidably located in the bottom of the canister, is adapted to permit ingress and egress of water through the bottom wall in a first, or loading configuration position, and to block, confine, or restrict passage of water in a second, or storage configuration position. Mounted on the top surface of the base plate and spaced therefrom is a plurality of horizontal apertured plates, spaced from each other. The apertures in the plates are aligned and oriented with respect to each other so that some fuel rods extend through the array with their tips resting on the base plate; some fuel rods pass through the array to where their tips rest upon the first plate of the array which is adjacent to the base plate; some fuel rods pass through the array to where their tips rest upon the second plate in the array, and some rods have their tips resting upon the top plate of the array. As a consequence, adjacent rods are vertically displaced from each other so that the rod grasping tool can grasp a rod without interference from adjacent rods, the highest rods in the array being the last to be inserted.

The storage canister has mounted therein a plurality of corrugated plate members or spacers which extend along a portion of the interior length of the canister. Adjacent pairs of the plates define a plurality of longitudinally extending rod locating passages so that when a rod is inserted into a passageway, it maintains a fixed transverse location as it passes down the length of the canister until the tip passes into the array of apertured plates. Thus, the pairs of corrugated plate members define a plurality of rod locations within the canister. The apertures in the plates of the array are oriented so that no two adjacent rods rest upon the same plate, thus adjacent rods are vertically staggered with respect to each other. Each fuel rod is characterized by a weld bead where the rod tip is welded to the rod, both at the top and bottom thereof. The staggered arrangement of the rods permits the rods to be placed in close proximity to each other without the weld beads of adjacent rods interfering with each other, whether during insertion or as finally positioned within the canister.

As discussed heretofore, the exterior of the rod is characterized by a deposit of "crud" which, during insertion of the rod into the storage canister, is scraped off as it passes down between the corrugated plates. In order to facilitate removal of the "crud", a central opening or plurality of openings in the bottom wall of the canister communicates with the vacuum pump assembly through the base of the holder so that a current flows downward through the bottom of the holder. A significantly small volume of the surrounding pool water is also drawn in by the vacuum pump. This adjacent water flows upward through the central screened aperture of the base of the canister, and back out of the canister base through additional apertures encircling the central screened aperture in the base, thereby preventing a buildup of crud on the screen which must allow free upward flow later when in the storage configuration. To facilitate a large volume downward flow during the fuel rod loading configuration, the apertured base plate of the array of plates, and the array itself are lifted up from the bottom of the holder by pins or other means in the loading configuration, and, when the canister is full and is lifted out of the holder, the bottom wall of the canister moves up into contact with the base plate so that the apertured base plate rests against the bottom wall, thereby sealing off all the apertures in the wall except the central screen aperture while in the storage configuration.

The storage canister of the invention is provided with two slots on each side adjacent the top edge. A closure or cap member has eight locking cams oriented to fit within the slots, and threaded bolt members for rotating the cams to force them into the slots when the closure member is in position within the top end of the canister. Each bolt member has fitted thereon a circular tamper indicator having a detent recess on its underside. Within the top plate of the closure member are spring loaded plungers adapted to fit within the detent recesses of the tamper indicators, and thus, as the bolts are screwed down to force the cams into the slots, the tamper indicator descends until the detent recesses are engaged by the corresponding plungers. The position of the indicators on the bolts in such that the detent is engaged at that point where the cams are firmly seated in the slots, thus locking the closure lid in place. Any further rotation of the bolts, in either direction, will cause permanent distortion of the indicator members inasmuch as the plungers in the detents prevent rotation of the indicator members. Thus, any attempt to unlock the closure after it is properly locked in place will result in a distorted indicator, thereby indicating tampering.

The various features and advantages of the present invention will be more readily seen from the following detailed description, read in conjunction with the accompanying drawings.

DESCRIPTION OF THE DRAWINGS

FIG. 7A is a cross-section elevation view of the canister of the invention illustrating in detail the closure and closure locking mechanism;

FIG. 7B is a perspective view of a detail in the closure locking mechanism;

FIG. 8 is a perspective view of the closure and locking apparatus of FIG. 7;

DETAILED DESCRIPTION

Figure 1:
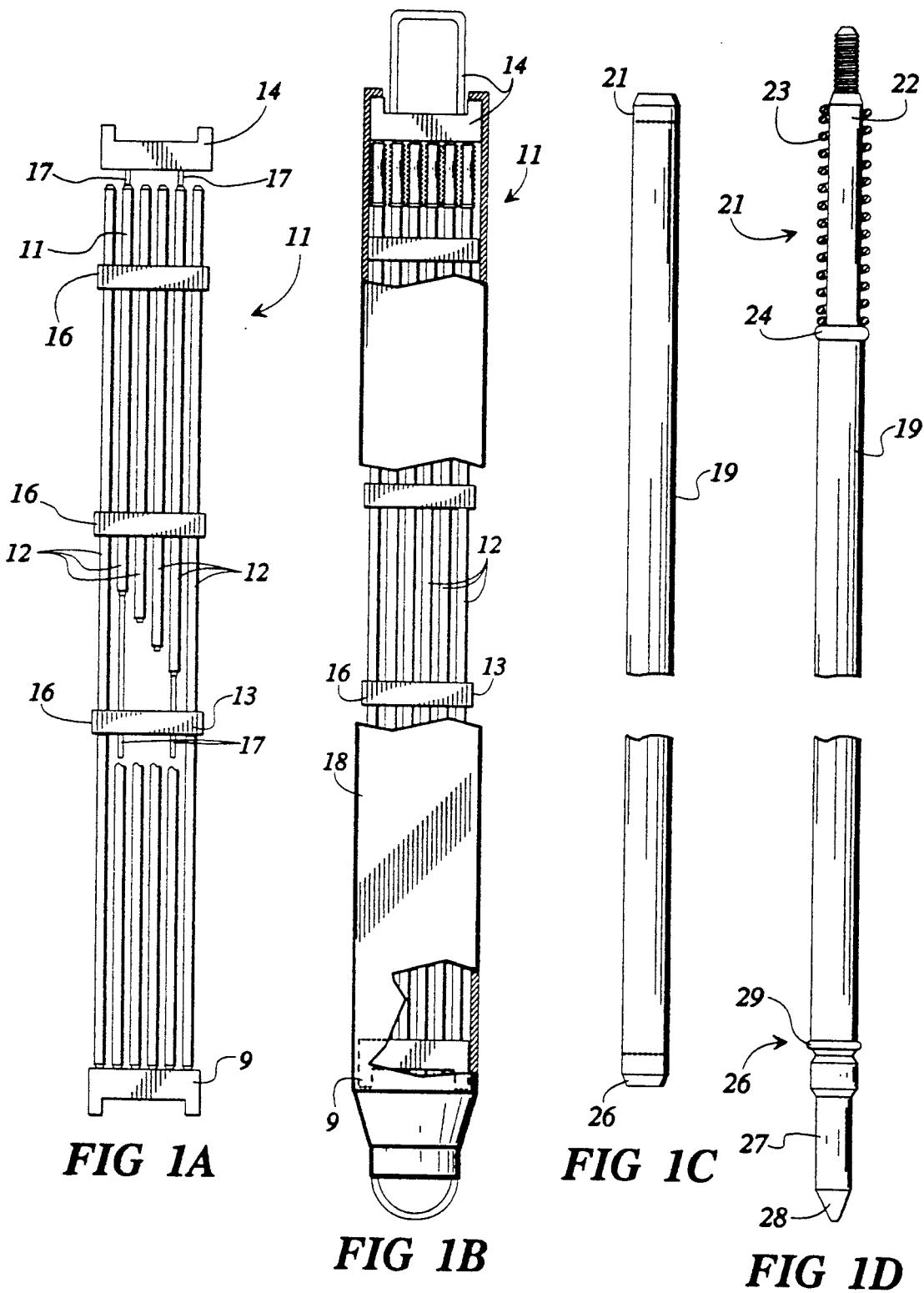
FIGS. 1A and 1B is an elevation, partially cut away view of a PWR (pressurized water reactor) and a BWR (boiling water reactor) fuel rod assembly contained in a holder.
FIGS. 1C and 1D is an elevation view of a PWR and a BWR fuel rod.

In FIGS. 1A and 1B there is shown both a PWR and a BWR fuel rod assembly 11, comprising a plurality of fuel rods 12 mounted in a skeleton 13 which comprises a top end member 14, a plurality of grids 16, and a plurality of guide tubes 17 which extend along the approximately fourteen foot length of the fuel assembly 11. The BWR fuel rod assembly 11 is surrounded by a removable can or shroud in a rod assembly or cell 18 of generally rectangular cross-section. This can or shroud is removed prior to any consolidation operation. Member 14 is removed, as by cutting or reaming prior to removing the rods from the assembly 11 on PWR's. A BWR fuel rod assembly is similar except fuel rods (typically 8) are used in place of the guide tubes to tie the top and bottom end members 9 and 14 together. The top nuts are typically removed to allow the top member 14 to be placed aside prior to removing the rule rods. The present invention is directed toward the method of removing the rods from skeleton 13 and precisely packing them in a fuel rod storage canister, and to the fuel rod storage canister which is not shown in FIG. 1.

In FIGS. 1C and 1D there are shown typical PWR and BWR fuel rods each comprising an elongated hollow tube 19 of suitable material, such as Zincalory, filled with fuel pellets, not shown. At the top end of the tube 19 is a first cap member 21. The BWR cap member 21 is provided with an elongated tip portion 22 which supports a coil spring 23, crimped in place on the elongated portion 22. When the rod 19 is in the fuel cell within the reactor, it tends to grow in length. Spring 23 insures that the rod 19 remains firmly in place within the cell despite the growth. Cap member 21 is welded to and seals the top portion of tube 19, resulting in a weld bead 24 which is slightly larger in diameter than the tube 19. The lower end of tube 19 is sealed by a second cap 26 having an elongated tip portion 27 ending in a tapered tip 28. Cap 26 is welded to tube 19, resulting in a weld bead 29. Weld beads 24 and 29 can prevent fuel rods from being positioned closely together within a fuel storage canister, except where, as with the present invention, the rods are vertically displaced relative to adjacent rods.

Figure 2:
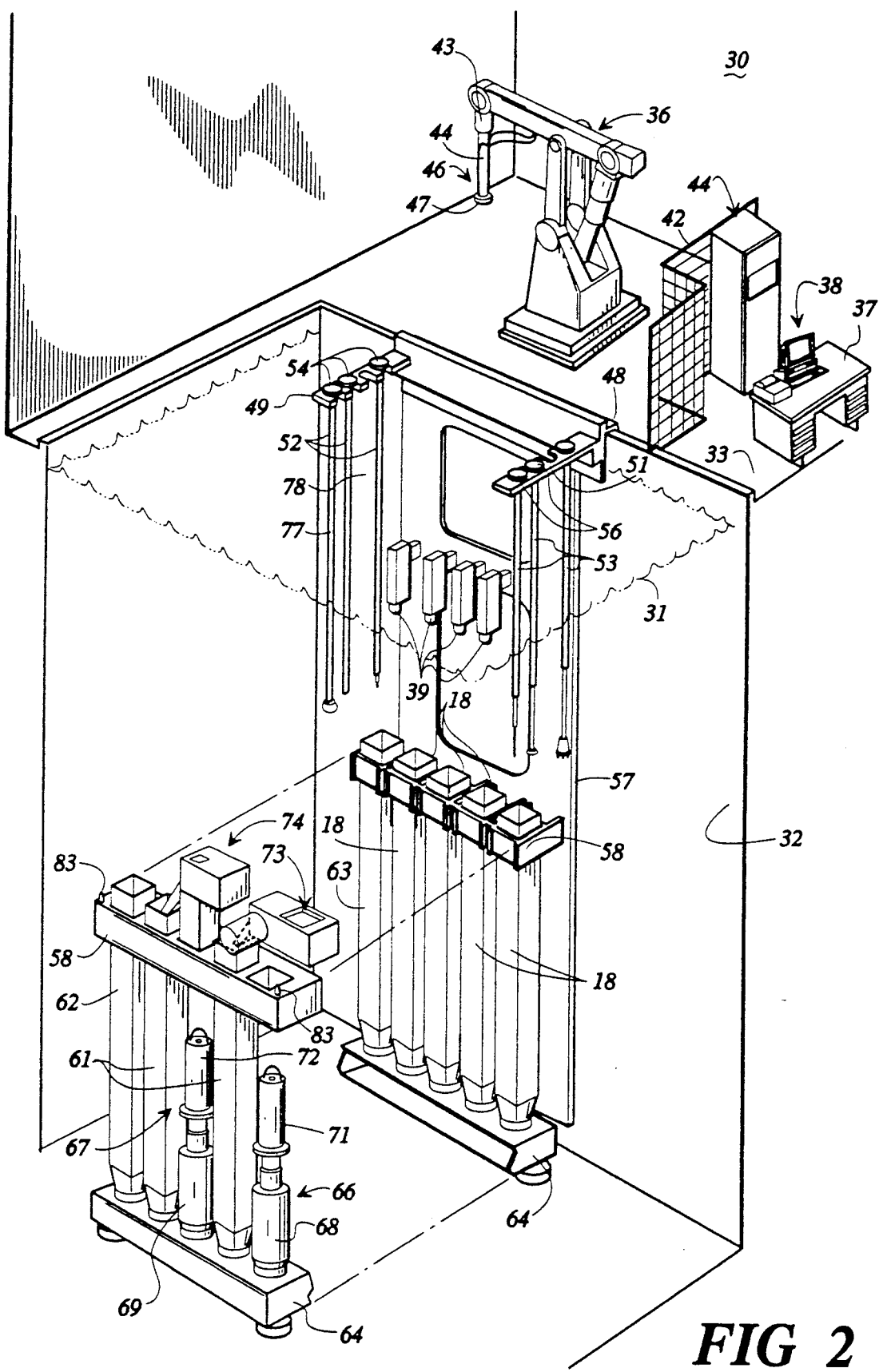
FIG. 2 is a partially exploded perspective view of a rod consolidation apparatus which utilizes the present invention.

FIG. 2 depicts the various elements of the rod consolidation system 30, a majority of the components of which remain below the water line 31 of the storage pool 32. At the top of pool is a deck 33 adjacent thereto which has thereon the major control components of the system 30. These components comprise a computer 34 which controls a five or six axis commercially available robot 36 which, in turn, handles the long reach tools for the system 30 and for the method of rod consolidation. All of the functions of the system and steps of the method, with a few exceptions, are performed by the robot 36 and its associated long reach tools under control of the computer 34. Adjacent computer 34 is a monitoring station 37 which includes a closed circuit television monitor 38, the signals for which are received from a plurality of underwater television cameras 39, as will be explained more fully hereinafter. A protective wire cage 42 protects both the operator and the equipment from any accidental contact with the robot 36.

Attached to the free or distal end 43 of the arm of robot 36 is a shaft 44 having, at its lower or distal end 46 a quick change coupler 47. Quick change couplers are commercially available items, and any of a number of types of such couplers may be used.

A bracket 48 mounted on a curb at the top of the pool 32 has mounted thereto first and second tool racks 49 and 51 for holding a plurality of long reach tools 52, 52 and 53, 53, each having, at its top end, a quick change coupler 54 and 56 that matches quick change coupler 47. Each of the tools 52 and 53 is designed to perform a specific task, and when that task is to be performed, the robot removes that tool from the rack by means of the coupling, causes it to perform the task, and returns it to the rack. This arrangement has the important advantage of enabling almost all of the steps of the consolidation process to be performed within the pool, without the necessity of active human intervention.

Also mounted to bracket 48 is a depending frame member 57 to which is mounted a work table 58, shown exploded in FIG. 2. Alternatively, the work table 58 can be supported by the header 64 and joined thereto by an appropriate connecting structure. Work table 58 has mounted in apertures therein four fuel rod assembly holders 18, 18, 18 two scrap canister holders 61, 61, and two fuel rod canister holders 62 and 63. Holders 18, 62, and 63 rest in apertures in a support base or header 64, which also functions as a manifold for a pair of vacuum filter assemblies 66 and 67, each comprising a pump 68, 69 and filtering element 71, 72. Also mounted on work table 58 adjacent one of the scrap canister holders 61 is a grid compacting apparatus 73 and mounted on table 58 adjacent another of the scrap canister holders 61 is a guide tube chopper and compactor 74. Both compactors 73 and 74 have foldable chutes (not shown) for emptying the compacted trash into its adjacent scrap canister. The remaining trash canister in its holder 61 is for other scrap that is not compacted.

Television cameras 39, 39 and 39 are mounted to frame 57 above the table 58. The cameras are commercially available items having zoom lenses and integral lighting contained in waterproof housings. The cameras monitor the operation of the system, and more particularly, the location of the long reach tools 52 and 53 during operation. It is possible, using an appropriate tool calibrator fitted with proximity switches and located at the work table elevation in conjunction with the computer 34 and the robot 36, to position the distal or operative end of each tool to within twenty one-thousandths of an inch, thereby exceeding any accuracy obtainable when the tools are manipulated by other means.

Mounted on table 58 at the corners thereof are locator pins 83. One of the long reach tools carries an electro-magnetic locator member thereon. Before operations are begun, this locator is placed over each of the locator pins 83 in turn and it generates an electrical signal which is transmitted to the computer. The combined inputs of the locating pins 83 enables the computer to determine the precise location of all of the various elements of the work table.

Figure 3:
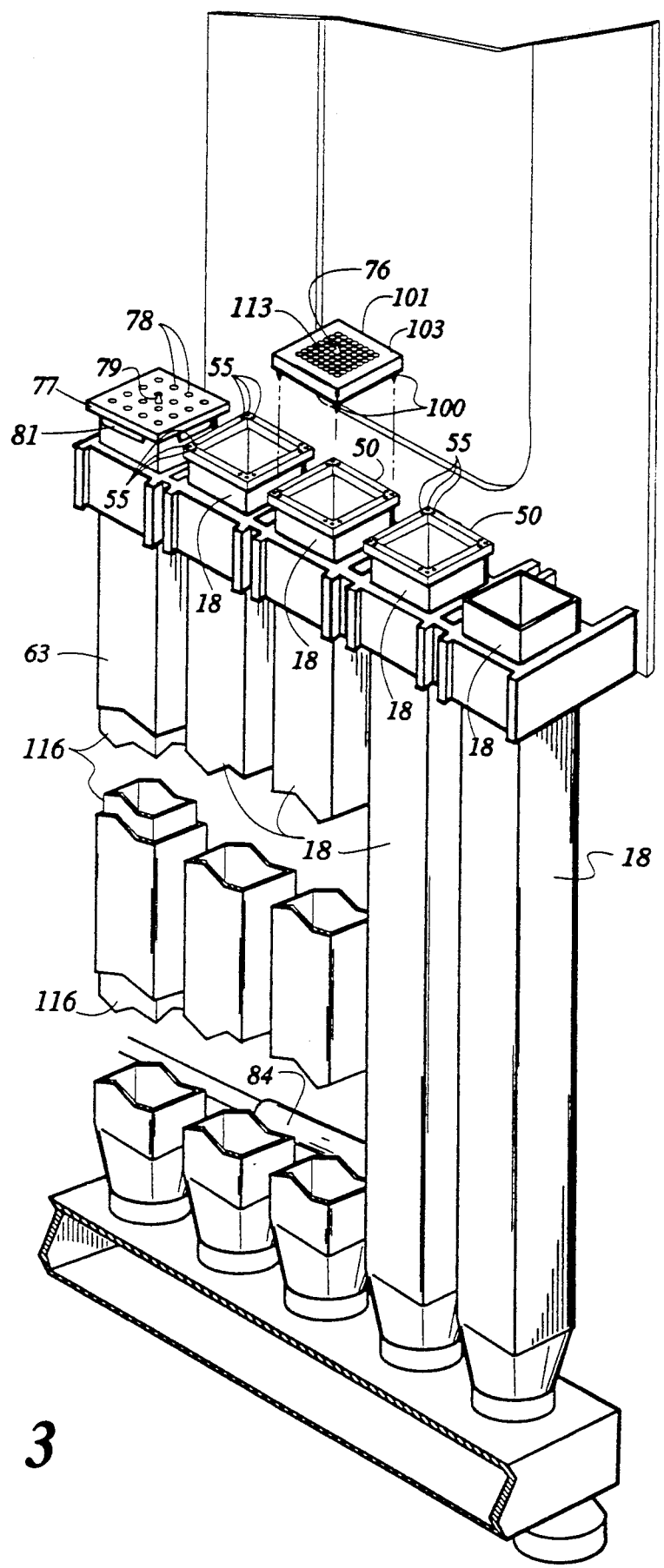
FIG. 3 is a perspective view of a portion of the apparatus of FIG. 2.

FIG. 3 is an perspective partial view of the apparatus of the present invention, as used for locating a pulling tool over a fuel rod assembly, and for locating the tool over a fuel rod canister in which the rods are to be compacted.

As shown in FIG. 3 a funnel plate guide 101 having a top portion 103 and a plurality of spaced indexing pins 100 on the under side thereof is placed over a fuel rod assembly holder 18. At least two of holders 18 have flanges 50 formed at the top thereof. Flanges 50 have a plurality of indexing holes 55 drilled therein into which indexing pins 100 fit. The spacing of holes 55 and pins 100 is such that guide plate 101 can be indexed to any of four positions in the embodiment of FIG. 3.

As shown in FIG. 3, top portion 103 has an array of funneled holes 113, 113 therein and extending through plate 101. These funnels 113 function to guide the rod removing tool so that it is centered over a fuel rod in holder 18. Because of the funnel shape of the holes 113, guide plate 101 can only guide the tool over every fourth rod in the fuel rod assembly, but with the four position indexing provided by holes 55 and pins 100, the tool eventually accesses all of the rods. The guide plate 101 has an upwardly extending pin 76 as seen in FIG. 3 and is moved by one of the long reach tools adapted to pick it up by pin 76 and move it to a new position where pins 100 engage different holes 55.

The rod pulling tool has a rod grasping means, such as a collet, not shown, which grasps the rod over which it is centered and pulls it up inside of the tool for substantially its entire length. As the rod is pulled out of the rod assembly, radioactive "crud" is scraped from the rod, which is pulled down through the holder by the water current created by pumps 68 and 69 and forced through filter elements 71 and 72. This action assures that the water will stay sufficiently clear for the monitoring cameras 39 to create a clear picture and, more importantly, does not allow radioactive crud to contaminate the pool water.

After a rod has been pulled from a fuel rod assembly and drawn up into the rod pulling tool, the tool is swung to a position over the canister holder 63 containing a storage canister 116. Mounted on the top edges of a canister 116 within holer 63 is a guide plate 77. Plate 77 has a plurality of funnel shaped holes 78, 78 and a grasping pin 79 the same as with plate 101 in FIG. 3. On the underside of plate 77 are downwardly extending spaced ridges 81 which form locating grooves (not shown) extending parallel to each side of plate 77.

The top edges of the canister 116 fit within the grooves, thereby giving plate 77 a plurality of possible index positions. The ridges or flanges 81 do not extend to the full length of each side, thereby providing clearance for the corners of the canister. Other means of locating and indexing guide plates 101 and 77 may be used as shown, for example, in the aforementioned U.S. patent application Ser. No. 07/831,404.

After the rods have been removed from the rod assemblies and placed in the canister 116 in holder 63, the skeleton remaining in holder 18 is converted to scrap, by means of long reach cutting tools an compactors 73 and 74. As portions of the fuel assembly are cut away, means, not shown, are provided for raising the skeleton in holder 18 so that the cutting tools have access thereto.

The operation of the apparatus of FIGS. 2 and 3 is as follows. An empty fuel rod canister 116 is placed in holder 63 and three or four fuel rod assemblies 11 are transferred, under water, to holders 18, and empty scrap canisters are transferred to holders 61 less their lids. A stack of lids for the fuel rod canisters and a second stack of lids for the scrap canisters have been previously stored in wells (not shown) located in the work table.

The robot next selects a long reach tool having a cutter or cutters on the distal end thereof, and the top 14 of the PWR fuel rod assembly 11 is cut away and placed into a scrap canister. Alternately, a long reach tool having a nut runner on the distal end thereof is used to remove the retaining nuts and the top 14 of a BWR fuel rod assembly is removed and placed into a scrap canister.

After returning the cutting tool or nut running tool to the rack 49 or 51, the computer directs the robot to couple with a suitable tool to place funnel guide plates 101 onto holder 18 by means of grasping pins 76 and guide plate 77 onto holder 63 and then return the tool to rack 49 and 51. The robot then couples to a fuel rod transfer tool, the distal end of which is guided to the fuel rods by guide plate 101. The tool grasps the top of a rod and pulls it up out of the rod assembly into the tool. After the rod is within the tool, robot 36 swings the tool to a position over guide plate 77 so that the tool may release the rod into holder 63. The canister 116 in holder 63 is preferably, although not necessarily, filled from the center outwardly. After enough rods have been removed and deposited in the canister to fill one-fourth of the rod positions, guide plate 77 is indexed to a second position. The depositing of the rods and the indexing continues until the canister contains all of the rods of the rod assembly. After all of the rods exposed by the holes 113 in plate 101 have been removed from the fuel rod assembly, plate 101 is indexed to a different position, thereby exposing a new set of rods. The process continues until all of the rods have been removed from the fuel assembly, and then operations are started on a second rod assembly and continued until the canister is filled. In practice, the rods of two or, in some cases, the rods of slightly more than two fuel assemblies can be consolidated into a single canister, thus making better use of the available storage space.

Figure 4A:
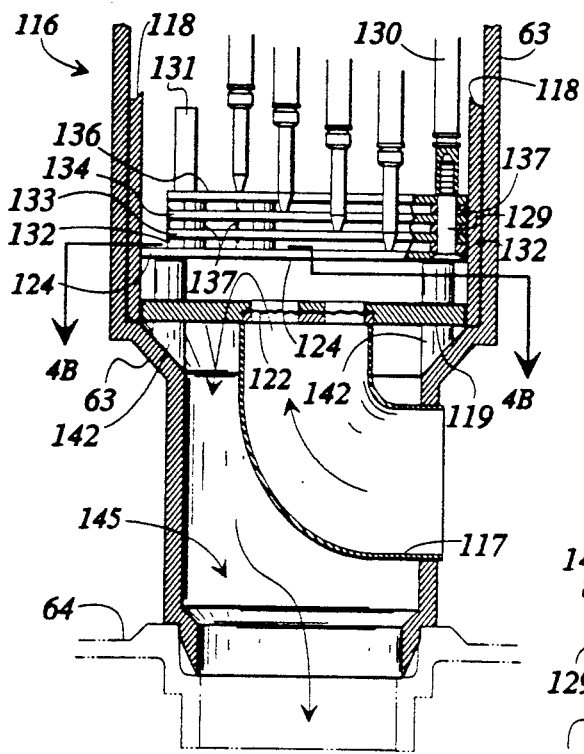
FIG. 4A is an elevation view of a portion of the apparatus of the present invention, shown in cross-section.
Figure 4B:
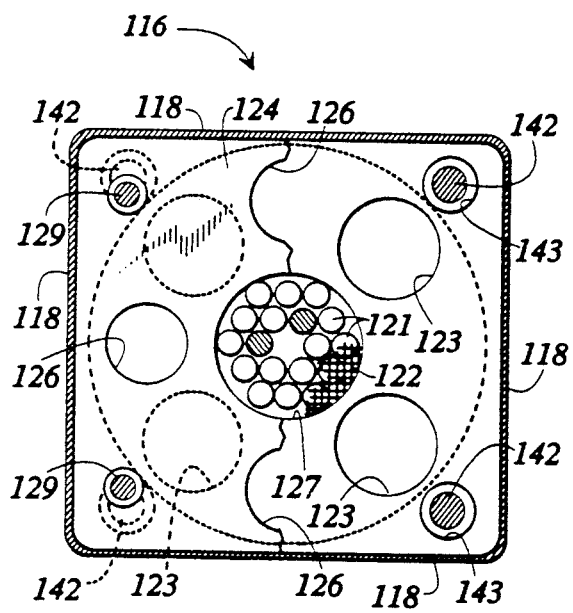
FIG. 4B is a plan view taken along the line 4B—4B of FIG. 4A.
Figure 5:
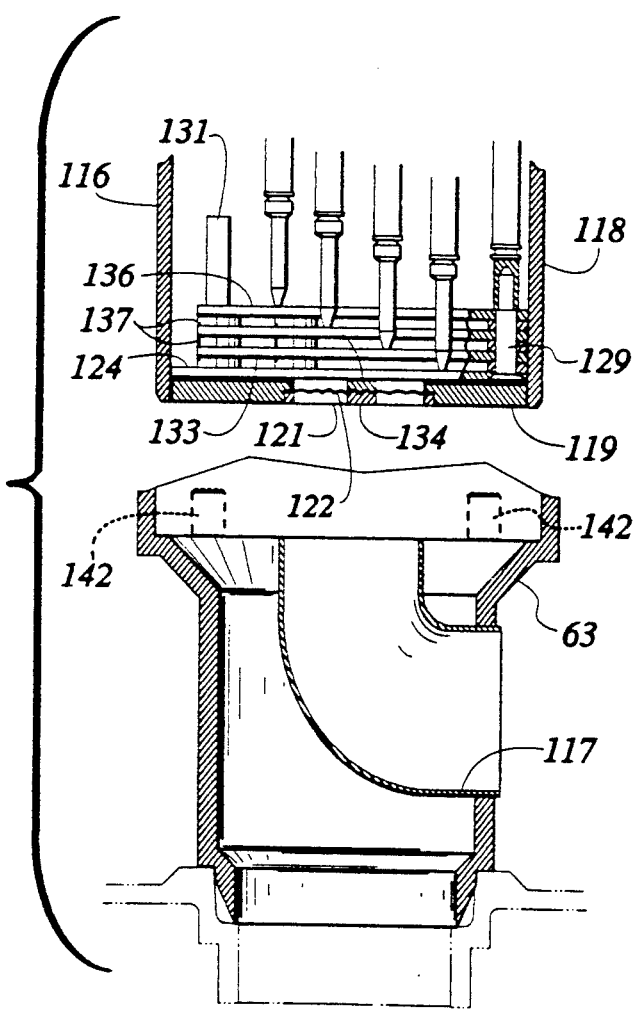
FIG. 5 is a partial cross-section view of the portion of the apparatus shown in FIG. 4A after the canister is removed from its holder.

In FIGS. 4A, 4B and 5 there is shown the bottom portion of the storage canister 116 of the invention as mounted in canister holder 63, which, in turn, is mounted on header or support base 64. The bottom end of holder 63 includes ducting 117 for introducing a current of water into canister 116 and for flushing it, as will be discussed hereinafter. Canister 116 comprises side walls 118 and an end wall 119 having a plurality of centrally located apertures 121, 121, as best seen in FIG. 4B. Mounted in place over holes 121 is a screen filter 122 for filtering "crud" and other matter. Apertures 121, 121 can be replaced by a single large centrally located aperture, but a plurality of smaller apertures affords better support for filter 122, which is of fine mesh and is somewhat fragile. Also located in end wall 119 are a plurality of spaced apertures 123, 123 as best seen in FIG. 4B.

Figure 4C:
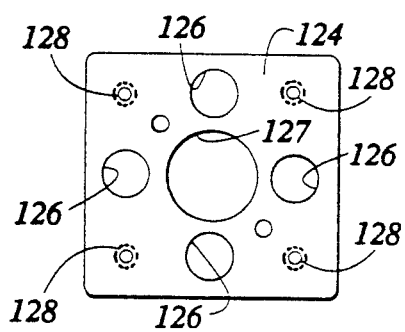
FIGS. 4C, 4D, 4E and 4F are plan views of elements for supporting the fuel rods within the storage canister of the present invention.
Figures 4D, 4E, 4F:
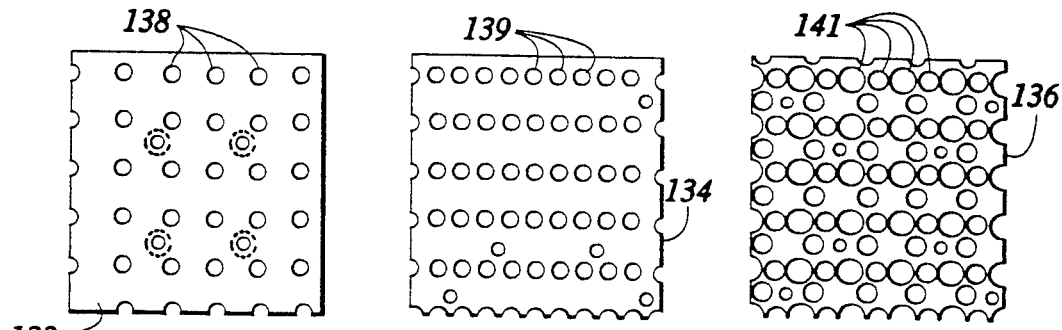

Within canister 116 and vertically slidable with respect thereto is an apertured base plate 124, the apertures 126, 126 of which are spaced forty-five degrees from the apertures 123 of end wall 119, as best seen in FIG. 4B. Base plate 124 also has a centrally located aperture 127 and a plurality of mounting holes 128, 128 for mounting pedestals 129, 129 in the form of shoulder screws and riser caps 131, 131 thereon. The orientation of the various apertures in base plate 124 is best seen in FIG. 4C. Mounted on base plate 124 and spaced therefrom by spacers 132, 132 is an array of spaced apertured parallel plates comprising a bottom plate 133, an intermediate plate 134, and a top plate 136, maintained in spaced relationship by spacers 137, 137 mounted on pedestals 129, 129, as best seen in FIG. 4A. Alternatively, the combination of pedestals, spacers, plates and caps may be in the form of welded or riveted construction. As best seen in FIGS. 4D, 4E and 4F, bottom plate 133 has a plurality of spaced apertures 138, 138 therein of sufficient diameter to permit passage therethrough of a first group of rod caps 26 to where the tips 28 rest upon the top surface of base plate 124. Intermediate plate 134, as seen in FIG. 4E has a greater number of spaced apertures 139, 139, a first group of which are aligned with apertures 138, 138 in plate 133, and a second group of which are offset therefrom. Thus, some rod caps or tips 28 pass through both plates 133 and 134 to rest upon plate 124, while others pass through plate 134 to rest upon the top surface of plate 133. However, adjacent rods do not have their tips 28 resting on the same surface. In a like manner, top plate 136, as seen in FIG. 4F, has a plurality of apertures 141, 141, a first group of which are aligned with both the apertures 138 and 139, a second group of which are aligned with the apertures 139 of the second group that are not aligned with apertures 138, and a third group of which are offset from the apertures 139 so that some rod tips 28 pass through apertures 141 to rest upon the top surface of plate 134. Finally, some rod tips 28 rest upon the top surface of top plate 136. As was pointed out heretofore, adjacent rods are vertically staggered with respect to each other so that the weld beads 24 and 29 do not interfere, and so that the grasping tool may grasp a rod without interference. Thus, the rods 19 can be placed close together and are readily insertable within the canister 116. Thus, for every pair of adjacent rods on a line in any direction, one rod is elevated with respect to the other.

Riser caps 131 are provided for support of the typically eight special end caps 26 which are furnished with threads on elongated tip portion 26 to screw into bottom end member 9. The threaded portion is cut free from end cap 26 to release end member 9. The risers 131 are of sufficient length to locate the weld beads 24 and 29 at the desired elevation relative to other weld beads.

Incorporated into holder 63 are spaced riser pins 142, 142 which pass through apertures 143, 143 in end wall 119 into the interior of canister 116 when the canister is placed in holder 63, thereby elevating base plate 124 and the array of plates 133, 134, and 136, during the loading operation as best seen in FIG. 4A. With the base plate 124 thus elevated, the primary downward flow as required to keep crud from escaping into the pool may flow within the canister walls 118, around edges of plates 133, 134 and 136 through openings 126 and 127 in base plate 124, through holes 123 in the bottom canister wall 119, through large conduit 145, which leads to the system filters and pumps. In addition, the top ends of the rods are elevated above the top end of the canister 118 to allow free access for the rod grasping tool. Also, with base plate 124 thus elevated, a smaller secondary water current may flow through conduit 117 and apertures 121 and out apertures 123, as shown by the arrows, thereby keeping the "crud" from clogging up screen 122 during the loading operation. As shown in FIG. 5, when the canister has been fully loaded, and is then lifted off of holder 63, base plate 124 is no longer supported by pins 142, and therefore it rests against the top surface of end wall 119, sealing off apertures 123, 123, so that water flow thereafter, while the loaded canister 116 rests in the pool, is through the aperture or apertures 121 equipped with screen filter 122 and upward through the canister. To facilitate this flow, plates 133, 134 and 136 preferably have scalloped edges, as shown in FIGS. 4D, 4E and 4F.

Riser pins 142 are shown as being part of holder 63, being affixed thereto. Other means for elevating base plate 124 and its array may readily be used, however. For example, pins 142 may be made vertically movable by suitable mechanical or other means, or something other than riser pins might be used. The principal purpose is to permit sufficient water flow to remove "crud" during the canister loading operation and to allow plate 124 to rest against the top surface of end wall 119 after removal of canister 116 from holder 63.

Figure 6A:
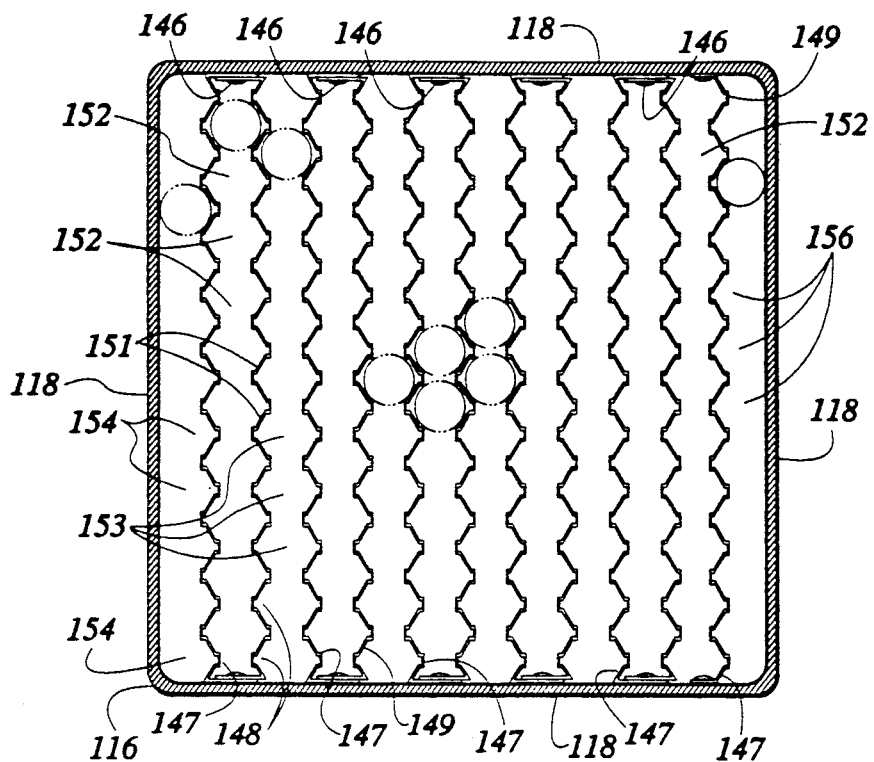
FIG. 6A is a plan view of the interior of the canister of the invention.

In FIG. 6A, there is shown a plan view of the interior of canister 116 showing the orientation and placement of the rod location and support means. A plurality of pairs of corrugated sheets preferably of stainless steel and extending along a major portion of the length of the canister 116 are affixed to the walls of the canister by, for example, rivets 146, 146, or other suitable means. Each pair of corrugated sheets comprises a first sheet 147 having indentations 148, 148 facing in one direction and a substantially identical corrugated sheet 149 having indentations 151, 151 facing in the opposite direction so that together the two sheets of each pair define a row of rod locations 152, 152. Also, the reverse side of each sheet 149 forms, with the reverse side of the first sheet 147 of the next adjacent pair, a row of rod locations 153, 153. In addition, the reverse side of the first sheet 147 of the first pair defines, with the wall 118 of the canister 116 a row of rod locations 154, 154, and the last sheet 147 also forms, in conjunction with wall 118, a row of rod locations 156, 156. As shown in FIG. 6A, six sheets 147 and five sheets 149 define twelve rows of rod locations.

Figure 6B:
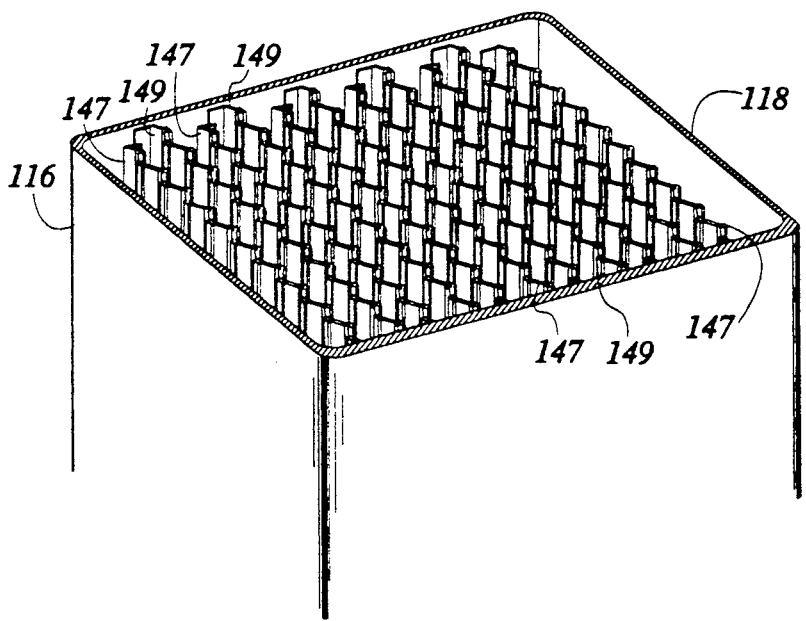
FIG. 6B is a perspective view of the canister of FIG. 6A.

In order that insertion of the spent fuel rods into canister 116 in the rod locations defined by the corrugated sheets may be facilitated, sheets 149 are vertically offset relative to sheets 147, as shown in FIG. 6B so that they extend upward past the ends of sheets 147. The last corrugated sheet 147 on the right, as viewed in FIGS. 6A and 6B has the adjacent canister side wall 118 extending past its upper end. In operation, when the robot 36 inserts a rod into canister 116, the rod is pressed slightly against the higher extending sheet 149 at the desired rod location, thereby insuring that the tip 28 of the rod will be guided as it is lowered between the sheets 147 and 149.

After canister 116 has been loaded with rods, as discussed hereinbefore, canister 116 is closed and capped by a lockable closure member.

In FIG. 7A and FIG. 8, there is shown a closure member 161 with associated tamper indicators 162, with member 161 being lockable within slots 163 in the walls of canister 116 adjacent the top edge 164 thereof.

Closure member 161 comprises a top plate 166 and a bottom plate 167 affixed to, and maintained in spaced relationship by a spacer member 168. At the four corners of member 168 are posts 169, 169 each having a pair of bores 171, 171 extending therethrough. Plate 167 is dimensioned to fit snugly within canister 116, and plate 161 is made slightly larger to rest upon top edge 164 of canister 116. Top plate 161 has affixed to the top surface a bail member 172 for facilitating lifting of closure member 161, an when member 161 is locked to canister 116, lifting of the entire assembly. The lifting bail is similar to the bail wheel and is an integral part of a BWR fuel assembly. Other lifting members having a different configuration may be used when consolidating PWR fuel assemblies. Also located on the top surface of plate 161 are a pair of stand-offs 173, 173 of the same height as member 172, so that a second canister lid may be supported on top of canister 116, where stacking of unused canister lids is feasible.

Journaled within the bores 171, 171 are a plurality of cam lock member 174, 174, the configuration of each of which is best seen in FIGS. 7A and 7B. Each member 174 comprises a tubular member 176 which receives a shaft 177 which is journaled within bores 171, 171 in member 168. Four screws, not shown, used to attach member 167 to 161 also serve as stops to retain shaft 177 within 161. Near either end of the tubular member 176 and extending along a portion of the length of tubular member 176 are two locking members 178, 178 and a centrally located actuating member 179, oriented as shown. Members 178, 178 are dimensioned to fit within their corresponding slots 163, 163.

Threaded through top plate 166 and located so that their ends bear against the actuating members 179 are actuating bolts or screws 181, 181. Each bolt or screw 181 has affixed, near the top thereof, a tamper indicator 162, and at the top end a shaped member 182 for providing purchase for a long reach tool used to rotate the screws or bolts 181. As each bolt 181 is screwed into and through top plate 166, its end forces actuating members 179 down, causing shaft 176 to rotate and the locking members 178, 178 to rotate upward into slots 163, 163 until they bear against the top edge of slots 163, 163. When the four members 174 are rotated to where each locking member 178 bears against the top edge of its corresponding slot 163, closure member 161 is firmly locked in place, and the canister 116 is sealed by plate 167. This plate is equipped with a tubular screen filter 170 to prevent coolant flow from carrying crud particles into the surrounding pool. The coolant flow therefor enters at the base screen filter 122, flows upward through the canister via natural convection, through the top screen 170 and radially outward through spaces provided along sides of locking members 178 and their wider slots 163. In assembly of the locking mechanism, each screw is driven through plate 161 and a keeper 185 is affixed to the end thereof.

Figure 9A:
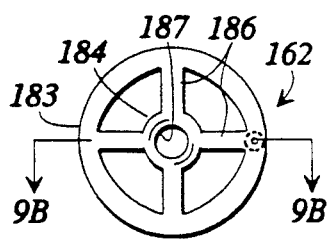
FIG. 9A is a plan view of a detail of the closure apparatus of FIGS. 7 and 8.
Figure 9B:
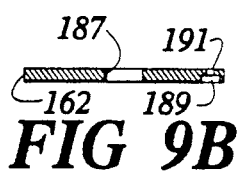
FIG. 9B is a cross-sectional view of the detail of FIG. 9A, taken along the line 9B—9B of FIG. 9A.

Once the canister 116 containing the spent rods 21 is sealed, the U.S. government requires that it not be re-opened when in its storage mode or phase. It is also necessary that any attempt to re-open it produce an irreversible indication that such an attempt was made. To this end, each tamper indicator 162, as shown in FIGS. 9A and 9B, is shaped like a spoked wheel having an outer ring 183, hub 184, and spokes 186. Hub 184 has a central bore 187 to allow member 162 to be fitted on and affixed to bolt 181. Member 162 is preferably made of a reasonably soft metal such as fully annealed stainless steel.

Located within plate member 166 adjacent each of the bolts 181 is a spring loaded pin 188, and on the underside of each indicator member 162, in the outer ring 183, is a detent recess 189. Each spring loaded pin 188 is spaced from the screw a distance such that it is directly under outer ring 183. Each indicator member 162 is located on screw 181 such that just when locking member 178 engages the upper edge of slot 163, pin 188 pops into the detent recess 189. Any subsequent torque applied to bolt 181, in either direction, will result in a permanent distortion of indicator member 162, inasmuch as it is prevented from turning with bolt 181 by pin 188 riding in recess 189.

It may be the case that at some stage prior to loading rods into canister 116 it is necessary to check, for example, the proper positioning of member 162 on bolt 181, without distorting member 162. To this end, outer ring 183 is provided with a pin hole 191 extending therethrough to the recess 189. When spring loaded, pin 188 is engaged in recess 189, it can be depressed out of engagement by a suitable tool inserted into pin hole 191 so that bolt 181 and member 162 can be backed off. However, the hole 191 is sealed shut as by soldering or braising prior to the actual loading operation. This seal also affords a tamper indication inasmuch as it is removed or drilled, the evidence of tampering is apparent.

The present invention has been disclosed in a preferred illustrative embodiment thereof. Various changes, modifications, or alterations may occur to workers in the art without departure from the spirit and scope of the invention.

I claim:

1. A rod storage canister for use in a rod consolidation system wherein individual elongated rods, at least some of which have elongated tips on one end thereof, are withdrawn from an array of rods in a first fuel rod holder having a plurality of rod locations therein by means of a pulling tool having a distal, rod grasping end and are transferred to the storage canister, said storage canister having a loading configuration and a storage configuration and comprising;

an end wall and elongated side walls extending therefrom and defining an open ended container, means defining an array of a plurality of rod locations in said container, means within said container for vertically offsetting substantially all adjacent rods within said container, said means for offsetting being movable longitudinally relative to said end wall and adapted to rest against said end wall in said storage configuration, and closure means for said container for closing the open end thereof.

2. The rod storage canister as claimed in claim 1 wherein said end wall has at least one aperture therein for permitting ingress and egress of fluid to and from said container.

3. The rod storage canister as claimed in claim 2 wherein at least one aperture has fluid filter means located therein.

4. The rod storage canister as claimed in claim 2 wherein said means for offsetting adjacent rods includes means for blocking at least some of the apertures in said end wall when said canister is in said storage configuration.

5. The rod storage canister as claimed in claim 1 wherein said means for offsetting adjacent rods comprises a first apertured plate adapted to rest against said end wall in the canister storage configuration, and a plurality of apertured plates forming a stack of plates resting on said first plate.

6. A rod storage canister as claimed in claim 5 wherein the plates of said stack of plates are spaced from each other and from said first plate.

7. A rod storage canister as claimed in claim 5 wherein said stack of plates comprises a lower plate, an upper plate, and at least one intermediate plate, said lower plate being adjacent said first plate.

8. A rod storage canister as claimed in claim 7 wherein said plates are made of stainless steel.

9. A rod storage canister as claimed in claim 7 wherein said lower plate has a plurality of spaced apertures therein sized to allow a first group of rod tips to pass therethrough; said intermediate plate has a first group of spaced apertures therein sized to allow the first group of rod tips to pass therethrough and aligned with the apertures in said lower plate, and a second group of spaced apertures each of which is offset from the apertures of said first group and sized to allow a second group of rod tips to pass therethrough; and said top plate has a first group of spaced apertures therein sized to allow the first group of rod tips to pass therethrough and aligned with the apertures of said first group of apertures in said intermediate plate, a second group of spaced apertures sized to allow the second group of rod tips to pass therethrough and aligned with the apertures of said second group of apertures in said intermediate plate; and a third group of spaced apertures, each of which is offset from the apertures of said first and second groups and sized to allow a third group of rod tips to pass therethrough.

whereby, when rods are loaded into the canister, the rods of each of said first, second and third groups are vertically offset from the rods of the other groups and adjacent rods are vertically offset from each other.

10. A rod storage canister as claimed in claim 1 wherein said means defining an array of rod locations comprises first and second sets of longitudinally extending corrugated plates mounted in said container in spaced relationship with adjacent plates belonging to different sets, the corrugations of the plates of the first set forming, with the corrugations of the plates adjacent thereto, a plurality of rod locations.

11. A rod storage canister as claimed in claim 10 wherein the corrugated plates of said second set extend longitudinally toward the open end of said container a greater distance than the corrugated plates of said first set.

12. A rod storage canister as claimed in claim 10 wherein said corrugated plates are of stainless steel.

13. A rod storage canister as claimed in claim 10 wherein adjacent plates form a row of rod locations, the rod locations in any one row being offset laterally from the rod locations in the next adjacent row.

14. A rod storage canister as claimed in claim 1 wherein said closure means comprises means for locking said closure means to said container.

15. A rod storage canister as claimed in claim 14 wherein said closure means comprises means for actuating said means for locking.

16. A rod storage means as claimed in claim 14 and further including tamper indicating means on said closure means.

17. A rod storage canister as claimed in claim 14 wherein said container has at least one slot in a side wall thereof adjacent said open end, said means for locking comprising projecting means insertable in said slot when said closure means is in place on said open end of said container.

18. A storage canister as claimed in claim 17 wherein said actuating means comprises means for forcing said projecting means into said slot.

19. A rod consolidation system for removing nuclear fuel rods from a container and placing them in a storage canister, said system comprising;
   a storage canister having a loading configuration and a storage configuration, said storage canister having an end wall and elongated side walls extending therefrom defining an open ended container,
   means within said container for vertically offsetting substantially all adjacent rods within said container when the rods are loaded into the container, said means for offsetting being movable longitudinally relative to said end wall and being adapted to rest against said end wall in said storage configuration,
   holder means for holding said canister in its loading configuration, said holder means including means for moving said means for offsetting within said container longitudinally away from said end wall.

20. A rod consolidation system as claimed in claim 19 wherein said means for moving elevates said means for offsetting to a position wherein a rod inserted in said means for offsetting extends beyond the open end of said canister.

21. A rod consolidation system as claimed in claim 19 wherein said end wall has a plurality of apertures for permitting ingress and egress of fluid to and from said container, and said holder means comprises means for permitting passage of fluid through said apertures in said end wall.

22. A rod consolidation as claimed in claim 21 wherein said means for permitting passage of fluid comprises duct means within said holder.

23. A rod consolidation system as claimed in claim 21 wherein said means for vertically offsetting rods within said container comprises means for blocking at least some of said apertures in said end wall when said canister is removed from said holder.

24. A rod storage canister having a loading configuration and a storage configuration and comprising:
   an end wall,
   means forming an open ended container comprising side walls extending longitudinally from said end wall,
   locating means within said container defining a plurality of vertically offset rod locations wherein substantially all adjacent rods, when loaded into said canister, are vertically offset from each other, at least a portion of said locating means having a first rod loading position and a second rod storage position relative to said end wall,
   a closure member for closing the open end of said container,
   first locking means for affixing said closure member to said container, said container having means for receiving a portion of said first locking means in the locked position,
   and tamper indicating means for indicating when an attempt has been made to unlock said first locking means after said closure has been locked to said container.

25. A rod storage canister as claimed in claim 24 wherein said means for receiving a portion of said first locking means comprises at least one slot in a side wall of said container adjacent the open end thereof.

26. A rod storage canister as claimed in claim 25 wherein said first locking means comprises a rotatable member having a first projecting means adapted to fit within said slot to bear against an edge thereof in the locked position.

27. A rod storage canister as claimed in claim 26 wherein said rotatable member has a second projecting means, and said closure member has actuating means therein adapted to bear against said second projecting means for rotating said rotatable member.

28. A rod storage canister as claimed in claim 27 wherein said actuating means comprise a rotatable threaded member threaded through a portion of said closure member.

29. A rod storage canister as claimed in claim 28 wherein said tamper indicating means is affixed to said actuating means.

30. A rod storage canister as claimed in claim 29 and further including second locking means in said closure means for preventing rotation of said actuating means when said first locking means is in the locked position.

31. A rod storage canister as claimed in claim 30 wherein said tamper indicating means comprises a disc shaped member having first and second sides, and a detent recess on said first side, and said second locking means comprises a spring biased pin member adapted to fit into said detent recess when said first locking means is in the locked position.

32. The method of loading rods into a storage canister having a plurality of defined individual rod locations therein comprising the steps of
   removing individual rods from a rod assembly by means of a long reach tool,
   inserting each rod into the storage canister in one of the defined rod locations therein,
   vertically offsetting substantially all adjacent rods from each other within the storage canister,
   flowing fluid into the canister while the rods are being inserted therein,
   closing the canister with a closure means after the canister has been loaded,
   locking the closure means to the canister, and
   positioning a tamper indicator in a tamper indicating position on the closure means after it has been locked to the canister.

33. The method of loading rods into a canister as claimed in claim 32 and further including the steps of
   placing the canister in a holder prior to inserting the rods therein, and
   reducing the fluid flow into the canister after it has been loaded and closed.

34. The method of loading rods into a canister as claimed in claim 33 wherein the step of reducing the fluid flow into the canister comprises removing the canister from the holder.

* * * * *